US005895084A

United States Patent [19]
Mauro

[11] Patent Number: 5,895,084
[45] Date of Patent: Apr. 20, 1999

[54] CAM OPERATED MICROGRIPPER

[76] Inventor: George Mauro, 18 Simpson Rd., Windham, N.H. 03087

[21] Appl. No.: 08/801,715

[22] Filed: Feb. 19, 1997

[51] Int. Cl.⁶ ................................................. B25J 15/12
[52] U.S. Cl. .................. 294/100; 294/116; 901/38; 901/39
[58] Field of Search ............... 294/94, 99.1, 100, 294/103.1, 115, 116; 269/229, 231, 234; 279/4.08, 4.09, 51, 53; 901/36–39

[56] References Cited

U.S. PATENT DOCUMENTS

| 3,625,378 | 12/1971 | Attiz | 294/100 X |
| 3,630,391 | 12/1971 | Wilson | 294/116 X |
| 4,828,309 | 5/1989 | Germaine | 294/100 |
| 5,332,275 | 7/1994 | Conway et al. | 294/100 |

FOREIGN PATENT DOCUMENTS

| 3011837 | 10/1981 | Germany | 294/100 |
| 1248794 | 8/1986 | U.S.S.R. | 901/39 |
| 10111 | 6/1992 | WIPO | 294/100 |

Primary Examiner—Johnny D. Cherry
Attorney, Agent, or Firm—Davis and Bujold

[57] ABSTRACT

A microgripper for gripping objects in which gripper arms are actuated against a resilient bias by cams and cam followers powered by a stepper or servo motor operating through a lead screw and nut drive mechanism. Ramp cams, face cams and perimeter cams may be utilized and the arms of the microgripper may be rigidly or pivotally supported at the ends remote from the component gripping ends thereof.

12 Claims, 3 Drawing Sheets

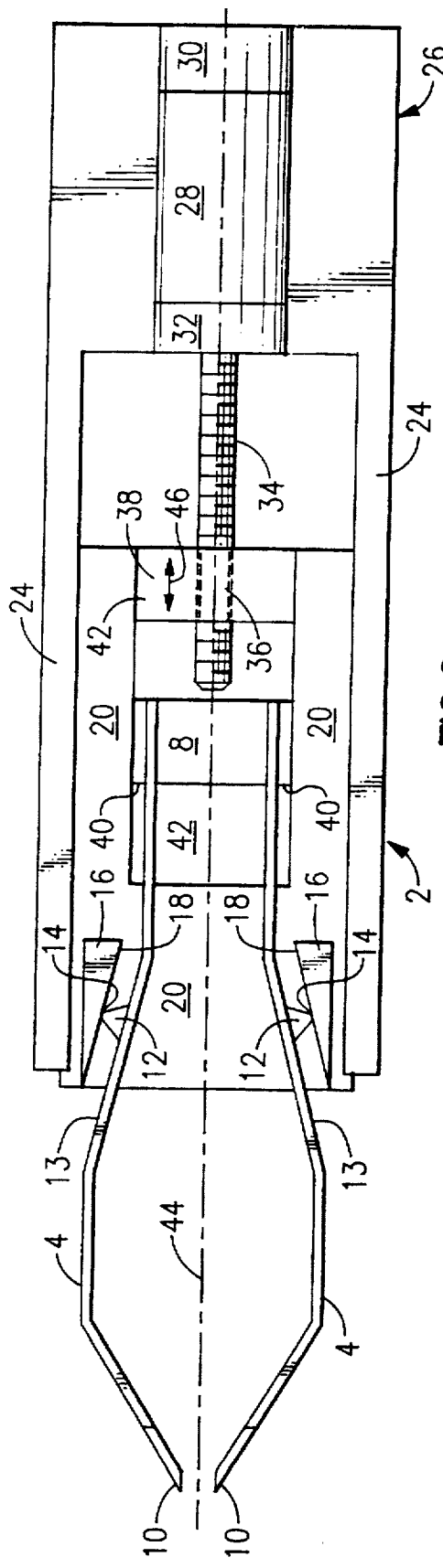

5,895,084

CAM OPERATED MICROGRIPPER

FIELD OF THE INVENTION

This invention relates to adjustable work piece mounting devices and, more particularly, to cam operated motor driven microgrippers for precisely gripping and positioning small components,

BACKGROUND OF THE INVENTION

Motor driven microgrippers are known in the prior art and are exemplified by the microgripper disclosed in U.S. Pat. No. 5,332,275 with respect to which the applicant of the present application is an inventor. The '275 patent discloses a microgripper construction which is difficult and expensive to manufacture and which relies upon pins sliding along the exterior of gripper arms to close the arms on a component to be gripped. Quite apart from the difficulty and expense of manufacturing the '275 microgripper, the gripper disclosed in that patent does not perform satisfactorily due to the operating pins sliding on the exterior of the leaf spring gripper arms, which by their nature, tend to have surface imperfections which render smooth operation of the gripper impossible or difficult to achieve utilizing normal manufacturing techniques. The imperfections on the gripper arms may appear small, but due to the ratio of the distance from the gripper arm supports to the imperfections relative to the distance from the gripper arm supports to the component gripping surfaces, any imperfection in the surface of the arm, which the operating pins come into contact with, is greatly magnified at the gripper component surfaces so that a one or two mil. defect can be magnified to become an undesirable ten or twenty mil. movement at the component gripper surfaces of the arms. Such imperfection is detrimental to the commercial success of microgrippers, as is disclosed in the '275 patent, in the world of ever increasing precision required in the gripping and placing of ever smaller components.

It is an object of the present invention to provide a microgripper which overcomes the shortcomings of the '275 patent as set forth above, while being less expensive and easier to produce on a commercial scale.

SUMMARY OF THE INVENTION

According to the invention there is provided a microgripper comprising: a) a support structure; b) two arms having first ends moveable toward and away from one another to grip and release an object therebetween, the arms being supported by the support structure, at second ends thereof with the first ends in close proximity to each other; c) means resiliently biasing the arms to a position in which the first ends are apart, d) each arm being associated with a cam and cam follower, one of the cam and cam follower being fast with the arm and the other of the cam and cam follower being supported by the support structure; e) means for relatively moving the cams and cam followers synchronously to move the first ends, when desired, toward one another against the bias of the resilient biasing means to grip the object and to allow the first ends, when desired, to move away from one another under the bias of the resilient biasing means to release the object.

Also according to the invention there is provided a microgripper for gripping and releasing an object, comprising: a) support structure including a support block; b) two cantilevered arms, an end of each of said arms being mounted on an end of said support block, another end of each of said arms being free and being capable of being moved toward and away from each other, the free ends of the two cantilevered arms normally being spread apart; c) actuator means affixed to said support structures; d) means to control the actuator means; and e) slide means supported by said support structure and supporting said support block, wherein said slide means is driven by said actuator means under control by the control means and is adapted to move the free ends of the arms toward or away from each other by way of two cams and two cam followers associated one with each arm, thereby providing, respectively, a gripping or releasing movement, one of the cam and cam followers of one arm being fast with that arm and being located outside of that arm and one of the cam and cam follower of the other arm being fast with that other arm and being located outside of that other arm, the two cams and cam followers being synchronously operable and being relatively slidable to force together the two arms so that the free ends of the two arms move toward each other when the cam and cam follower move relative to one another in a first direction and so that the free ends of the two arms move away from each other when the cams and cam followers move relative to one another in a direction opposite the first direction.

BRIEF DESCRIPTION OF THE DRAWINGS

The invention will now be described, by way of example, with reference to the accompanying diagrammatic drawings, in which:

FIG. 2 is a plan view of the microgripper of FIG. 1;

FIG. 3 is a fragmentary perspective view of a cam follower utilized in the first embodiment of the present invention;

FIG. 4 is a face view of an alternative cam follower to that illustrated in FIG. 3;

FIG. 5 is an end view of the cam follower illustrated in FIG. 4;

FIG. 6 is a variation of the cam follower illustrated in FIGS. 4 and 5 shown in end view;

FIG. 7 is a variation of the first embodiment of microgripper in which gripper arms are pivotally mounted to an arm support;

DETAILED DESCRIPTION OF THE INVENTION

Figure 1:
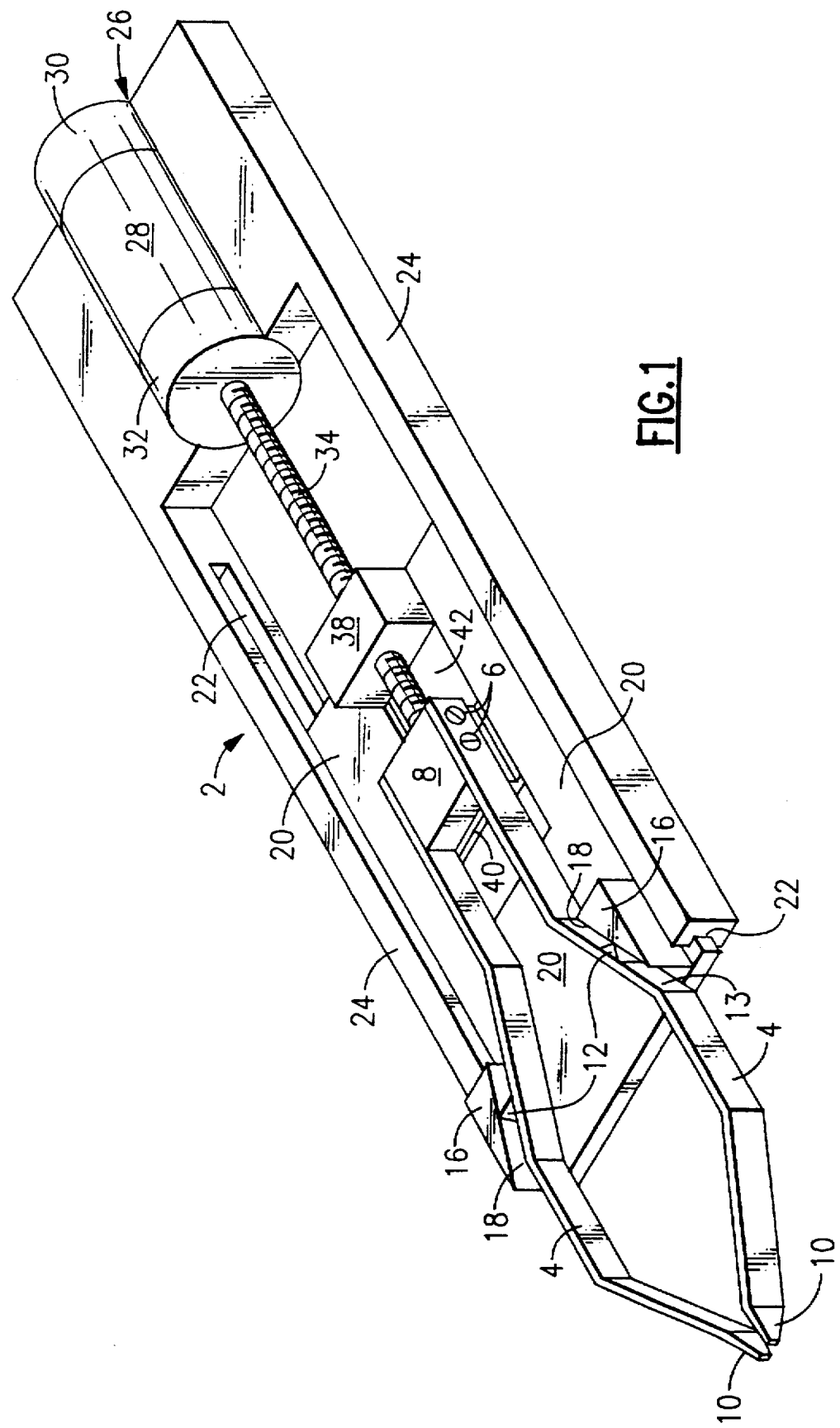
FIG. 1 is a perspective view of a first embodiment of microgripper according to the present invention utilizing a ramp cam operating mechanism.

With reference first to FIGS. 1, 2 and 3, the first embodiment of the present invention comprises a microgripper 2 which has a pair of forceps-like component gripper arms, each made fast, at one end, for example by the use of screws 6, to support block 8. The other ends 10 of the arms 4 form a component gripping tweezer-like structure. The arms 4 are leaf springs arranged in their relaxed condition to have the ends 10 spaced apart in a desired manner. Each arm carries a cam follower 12, on an outwardly facing surface 13 thereof, rigidly affixed thereto and having a substantially triangular horizontal cross-section to define an elongate narrow vertical cam contacting surface 14 (see FIG. 3). The surface 14 is defined by a small radius curvature in the horizontal plane (the plane in which lies the microgripper as shown in FIG. 2) and is precision ground and polished to provide a smooth cam contacting surface with no discernible imperfections. The resilience of the leaf spring arms 4 biases the cam followers 12 against opposed ramp cams 16 which define the cam ramps 18 in contact with the cam contacting surfaces 14. The cam ramps 18 are precision ground and polished to provide an extremely smooth surface without imperfection for engagement with the cam contacting surfaces 14 to provide extremely smooth camming operation with a consequent extremely smooth and accurate movement of the tweezer ends 10 of the arms 4.

The ramp cams 16 are fast with a cam support plate 20 supported for sliding movement in grooves 22 of opposed structural support bars 24 to provide for relative movement of the cam contacting surfaces 14 and the cam ramps 18 to close the tweezer-like ends 10 against the resilience of the leaf spring arms 4 to grip a component when the relative movement is in one direction and to allow the tweezer ends to open under the resilient influence of the leaf spring arms 4 when relative movement is in the opposite direction.

The support bars 24 are rigidly interconnected in parallel relation to one another by a motor and support structure 26 which includes a server motor 28, an encoder 30 to provide information concerning motor operation and a gearhead 32 by which the motor 28 is connected to a lead screw 34. The lead screw 34 extends to and engages a threaded opening 36 of a cam operating block 38 rigidly attached to the cam support plate 20.

A cross member 40 interconnects the support bars 24 and is rigidly connected at midspan, through an opening 42 in the cam support plate 20, to the support block 8.

In the position shown in FIGS. 1 and 2, the cam contacting surface 14 is approximately halfway along the cam ramp 18 of each arm and the tweezer ends 10 are partially closed. To further close the tweezer ends 10, the motor 28 is operated by control means (not shown) with reference to the encoder 30 to rotate the lead screw 34 by way of the gearhead 32, to move the cam operating block 38, by virtue of engagement of the lead screw 34 with the threaded opening 36, toward the tweezer ends 10. This movement of the cam operating block 38 moves the cam support plate 20 along the grooves 22, to move the cams 16 toward the tweezer ends 10 thereby moving the cam ramps 18 relative to the cam contacting surfaces 14 to urge the arms together against their resilient bias to bring the tweezer ends together to grip a desired component.

Movement of the motor 28 under the influence of the aforementioned control to produce rotation of the lead screw 34 in the opposite direction to that described above will reverse the functioning of the microgripper and will allow the tweezer ends 10 to open under the resilient bias of the leaf spring arms 4. The microgripper defines a longitudinal center line 44 with components on opposite sides of that center line in the plane of the paper carrying FIG. 2 being a mirror image of one another. The motor 28, gearhead 32 and lead screw 34 operate to move the cam operating block 38 along the center line 44 to operate the cams 16 and cam followers 12 symmetrically one on either side of the center line 44 in the direction illustrated by the arrows 46.

While the motor 28 has been described as being directly associated with encoder 30, it will be appreciated that an encoder, e.g. a linear encoder, could be located elsewhere in the microgripper to provide control of motor operation. Further the encoder could be replaced by a strain gauge disposed to determine the closing pressure applied by the tweezer ends 10 to a component being gripped.

FIGS. 4 and 5 illustrate an alternative form of cam follower in which the cam follower is in the form of a hemispherical hardened ground and polished member fast with the arm 4.

FIG. 6 illustrates a variant of the hemispherical cam follower of FIGS. 4 and 5 in which the cam follower 12 is a substantially hemispherical mound formed by deformation of the arm 4. Here the cam contacting surface 14 may be ground and polished to provide the required smoothness and absence of imperfections.

FIG. 7 illustrates a variation of the first embodiment of the invention in which the rigid connection of the arms 4 to the support block 8 is replaced by pivots 48 by which the arms 4 are pivotally attached to the support block 8 to allow free pivotal movement of the arms 4 about respective vertical axes. Resilient biasing of the arms 4 to an open condition of tweezer ends 10 is provided by a coil spring 50 extended between the arms 4 and located by tabs 52 forming part of or supported by the arms 4. Again, in this embodiment, the arms are biased apart to be closed against that bias by the cam arrangement illustrated in FIGS. 1 and 2. FIG. 7 illustrates in a fragmentary form only, this variation of the embodiment shown in FIGS. 1 and 2 which otherwise is substantially unchanged.

Figure 8:
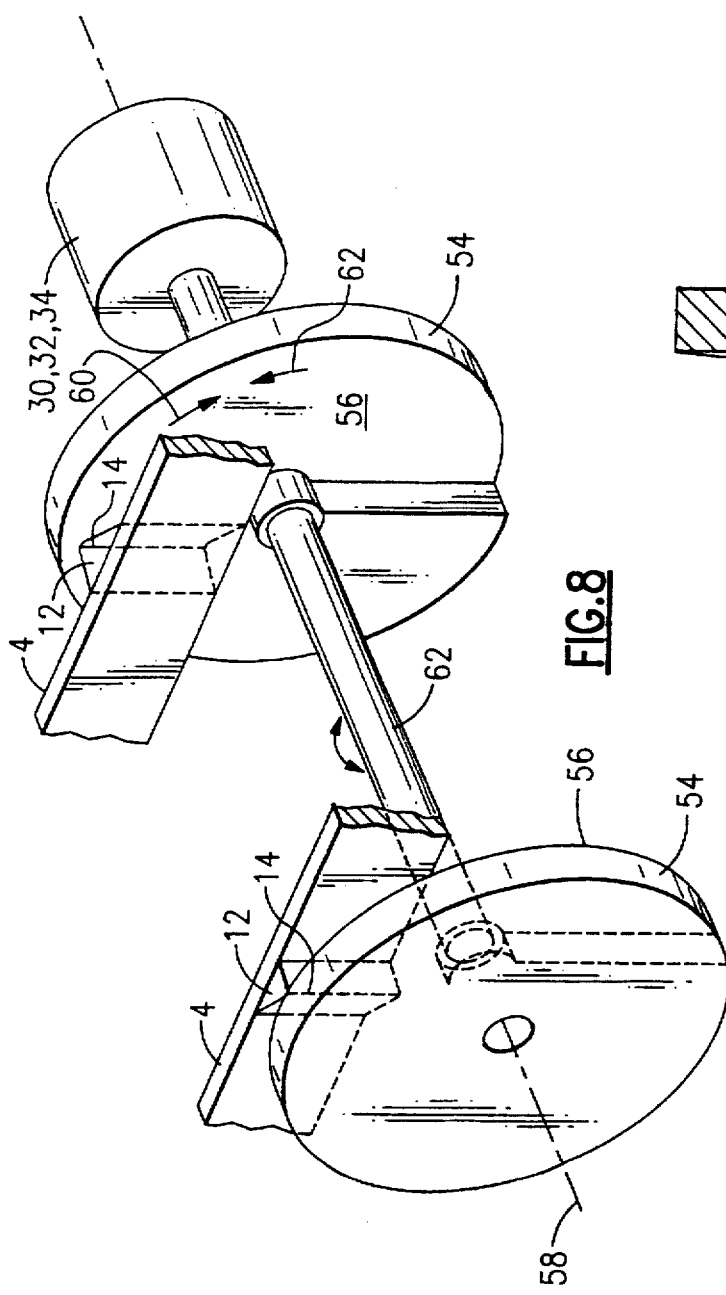
FIG. 8 is a fragmentary illustration of a second embodiment of microgripper according to the present invention utilizing rotary face cams in place of the ramp cams utilized in that first embodiment.

With reference now to FIG. 8, the ramp cams 16 are replaced in the second embodiment by face cams 54 defining circular cam ramps 56 which are resiliently engaged by the cam contacting surfaces 14 of cams 12 mounted on arms 4 for movement of the arms toward one another on rotation of the cams in one direction about axis 58 and to allow the arms 4 to move apart by virtue of their resilient bias upon rotation of the cams 54 in the opposite direction. Rotation in the direction of arrow 60 will close the tweezer ends 10 while rotation in the direction of arrow 62 will allow the tweezer ends to open. The cams 54 are mirror images of one another and are mounted on a common shaft 62 by which they are connected to the rotary output of servo motor 28 by way of gearhead 32. In this embodiment, the mounting arrangements for the arms 4 remain substantially in accordance with and illustrated with respect to FIGS. 1 and 2, while the encoder 30, motor 28 and gearhead 32 are, likewise, rigidly supported to the support block 8, with the axis 58 running transverse of the arms 4 with the cams 54 and shaft 62 mounted for rotation relative to the support block 8 to place the face cams substantially at the location of the cams 16 of FIGS. 1 and 2. Further detailed description of the structure of embodiment of FIG. 8 is believed unnecessary as it will be readily apparent to a man of ordinary skill in the engineering arts.

Figure 9:
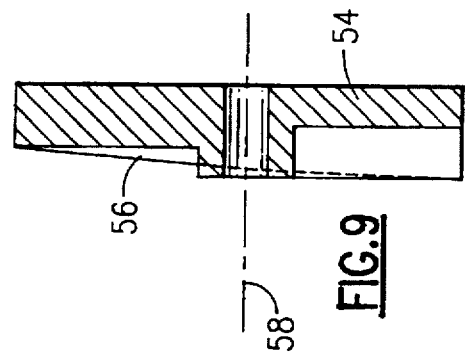
FIG. 9 is a vertical cross-section through one of the face cams illustrated in FIG. 8.

One of the cams 54 is illustrated in cross-section in FIG. 9.

Figure 10:
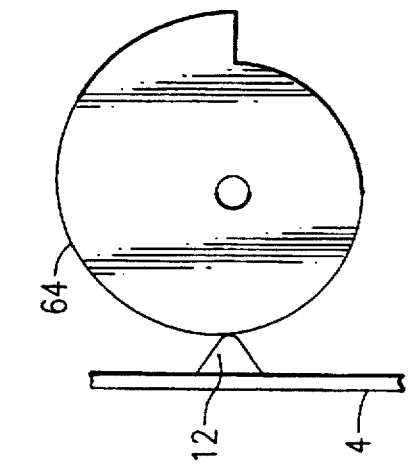
FIG. 10 is a fragmentary view of a cam arrangement of a third embodiment of microgripper according to the present invention in which a conventional cam is utilized for arm operation.

FIG. 10 illustrates a further embodiment in which conventional rotary cams, each having a peripheral cam follower contacting ramp 64, are utilized to engage each cam follower 12. Operation is substantially in accordance with the other embodiments of this invention although here, it will be appreciated, that the axes of rotation of the cams lie substantially parallel to axis 44 illustrated in FIG. 2. The cam 64 may be driven by a belt arrangement or gearing arrangement connecting them together for synchronous operation by an encoder, motor and gearhead arrangement (not shown in this figure).

It will be appreciated that while the embodiments of the present invention have been described with the use of a servo motor utilizing an encoder and a gearhead, other forms of actuator may be readily substituted as will be apparent to those skilled in the art; for example, a stepper motor could be used quite effectively.

It will also be appreciated that each of the arms may be of at least two parts with the outer parts carrying the tweezer ends 10 being removable to permit a placement of tweezer ends and substitution of different design ends, etc. In addition the cam followers could be cylindrical members or members having a part circular cross-section fast with the arms and presenting a smooth contact surface to the cams and, further, the cam ramp surfaces may not be linear ramps as illustrated, but could be of a varying slope to provide a desired operating movement of the tweezer ends.

In addition, while the microgripper of the present invention preferably has a cam and a cam follower associated with each arm, the invention is applicable to an arrangement in which only one cam and cam follower is used to control only one of the arms to control movement of that arm toward and away from the other arm.

It will be appreciated that while the invention has been described in diagrammatic form to illustrate the principles of the invention, including the best mode contemplated by the inventor of carrying out the invention, the precision engineering required is not illustrated or described. That precision engineering is, however, of a nature well known to those skilled in the art concerned and, as such, does not require detailed description in this document.

I claim:

1. A microgripper comprising:
   a) a support structure;
   b) two arms having first ends moveable toward and away from one another to grip and release an object therebetween, the arms being supported by the support structure, at second ends thereof with the first ends in close proximity to each other;
   c) means resiliently biasing the arms to a position in which the first ends are apart;
   d) each arm being influenced by a cam and cam follower, one of the cam and cam follower being fast with the arm and the other of the cam and cam follower being supported by the support structure;
   e) means for relatively moving the cams and cam followers synchronously to move the first ends, when desired, toward one another against the bias of the resilient biasing means to grip the object and to allow the first ends, when desired, to move away from one another under the bias of the resilient biasing means to release the object; and
   f) wherein each cam follower is of substantially triangular cross-section providing an elongate substantially line contact with the associated cam.

2. A microgripper according to claim 1 wherein each cam is one of a ramp cam, face cam and a cam with a perimeter cam surface.

3. A microgripper according to claim 1 wherein the cam is a ramp cam having a ramp surface and the line contact is normal to the slope of the ramp surface.

4. A microgripper according to claim 3 wherein the support structure provides for sliding movement of the ramp surface over the cam follower to move the first ends and the means for relatively moving is an actuator, mounted on the support structure, provided to control and power the sliding movement.

5. A microgripper according to claim 4 wherein the actuator is one of a stepper motor and a servo motor with an encoder.

6. A microgripper according to claim 1 wherein the second ends are rigidly supported by the support structure and the arms are leaf springs providing the means resiliently biasing the arms.

7. A microgripper according to claim 1 wherein the second ends are pivotally supported by the support structure and a spring urges the arms apart thereby providing the means resiliently biasing the arms.

8. A microgripper for gripping and releasing an object, comprising:
   a) a support structure including a support block;
   b) two cantilevered arms, an end of each of said arms being mounted on an end of said support block, another end of each of said arms being free and being capable of being moved toward and away from each other, the free ends of the two cantilevered arms normally being spread apart;
   c) actuator means affixed to said support structure;
   d) means to control the actuator means; and
   e) slide means supported by said support structure and supporting said support block, wherein said slide means is driven by said actuator means under control by the control means and is adapted to move the free ends of the arms toward or away from each other by way of two cams and two cam followers associated one with each arm, thereby providing, respectively, a gripping or releasing movement, one of the cam and cam follower of one arm being fast with one arm and being located outside of that arm and one of the cam and cam follower of the other arm being fast with the other arm and being located outside of the other arm, the two cams and cam followers being synchronously operable and being relatively slidable to force together the two arms so that the free ends of the two arms move toward each other when the cam and cam follower move relative to one another in a first direction and so that the free ends of the two arms move away from each other when the cams and cam followers move relative to one another in a direction opposite the first direction; and
   f) wherein each cam follower is a member fast with its associated arm and of substantially triangular cross-section providing an elongate substantially line contact with the associated cam.

9. A microgripper according to claim 8 wherein the arms are leaf springs to provide a bias tending to move the free ends away from each other in opposition to the force applied by the cams and cam followers.

10. A microgripper according to claim 8 wherein each cam is one of a ramp cam, face cam and a cam with a perimeter cam surface.

11. A microgripper according to claim 10 wherein the cam is a ramp cam having a ramp surface and the line contact is normal to the slope of the ramp surface.

12. A microgripper comprising:
   a) a support structure;
   b) two arms having first ends relatively moveable toward and away from one another to grip and release an object therebetween, the arms being supported by the support structure, at second ends thereof with the first ends in close proximity to each other;

c) means resiliently biasing the arms to a position in which the first ends are apart;

d) at least one of the arms being influenced by a cam and cam follower, one of the cam and cam follower being fast with at least one arm and the other of the cam and cam follower being supported by the support structure;

e) means for relatively moving the cam and cam follower to move the first end of the at least one arm, when desired, toward the other, against the bias of the resilient biasing means to grip the object and to allow the first ends, when desired, to move apart under the bias of the resilient biasing means to release the object; and f) wherein each cam follower is of substantially triangular cross-section providing an elongate substantially line contact with the associated cam.

* * * * *